US012612501B2

(12) United States Patent
Yang et al.

(10) Patent No.: US 12,612,501 B2
(45) Date of Patent: Apr. 28, 2026

(54) SILANE CROSSLINKED ETHYLENE/α-OLEFIN BLOCK COPOLYMER BEAD FOAM

(71) Applicant: Dow Global Technologies LLC, Midland, MI (US)

(72) Inventors: Yunfeng Yang, Shanghai (CN); Haiyang Yu, Shanghai (CN); Jozef J.I. Van Dun, Horgen (CH); Miguel Alberto De Jesus Prieto, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 1067 days.

(21) Appl. No.: 17/763,862

(22) PCT Filed: Sep. 27, 2019

(86) PCT No.: PCT/CN2019/108490

§ 371 (c)(1),
(2) Date: Mar. 25, 2022

(87) PCT Pub. No.: WO2021/056406

PCT Pub. Date: Apr. 1, 2021

(65) Prior Publication Data

US 2022/0332913 A1 Oct. 20, 2022

(51) Int. Cl.
*C08J 9/18* (2006.01)
*C08J 9/232* (2006.01)

(52) U.S. Cl.
CPC ................. *C08J 9/232* (2013.01); *C08J 9/18* (2013.01); *C08J 2201/026* (2013.01); *C08J 2383/10* (2013.01)

(58) Field of Classification Search
CPC ........ C08J 9/232; C08J 9/18; C08J 2201/026; C08J 2383/10; C08J 2203/06; C08J 9/122; C08J 2353/00; C08J 9/16; C08J 9/009; C04B 35/524; C04B 35/571; C04B 38/02; C04B 2235/77; C04B 2235/96
See application file for complete search history.

(56) References Cited

U.S. PATENT DOCUMENTS 3,225,018 A 12/1965 Zutty
4,574,133 A 3/1986 Umpleby
5,266,627 A 11/1993 Meverden et al.
5,605,937 A 2/1997 Knaus
5,763,498 A 6/1998 Knaus
(Continued)

FOREIGN PATENT DOCUMENTS

CA 2183261 A1 6/1996
JP 2011-000839 A 1/2011
WO 2006/099631 A1 9/2006

OTHER PUBLICATIONS

D. Raps et al., Polymer 56 (2015), 5-19.

*Primary Examiner* — K. Boyle
(74) *Attorney, Agent, or Firm* — Boyle Fredrickson S.C.

(57) ABSTRACT

The present disclosure provides a process. The process includes (i) crosslinking pellets composed of a silane-grafted ethylene/α-olefin multi-block copolymer (Si-g-OBC) to a gel content from 10% to 80% to form crosslinked Si-g-OBC pellets; and (ii) foaming the crosslinked Si-g-OBC pellets to form crosslinked Si-g-OBC foam beads having a gel content from 10% to 80%.

8 Claims, 3 Drawing Sheets

CS1 (non-XL, gel 0%)

CS2 (non-XL (Si-grafted), gel 2.3%)

IE6 (gel 49.2%)

IE7 (gel 69.6%)

(56) References Cited

U.S. PATENT DOCUMENTS

| | | | | |
|---|---|---|---|---|
| 5,939,180 | A * | 8/1999 | Kobayashi .............. | B29C 44/06 264/45.4 |
| 7,608,668 | B2 | 10/2009 | Li Pi Shan et al. | |
| 8,729,143 | B2 | 5/2014 | Schips et al. | |
| 8,741,973 | B2 | 6/2014 | Schips et al. | |
| 2006/0199930 | A1 | 9/2006 | Li Pi Shan et al. | |
| 2008/0167421 | A1 | 7/2008 | Yalvac et al. | |
| 2012/0046373 | A1 | 2/2012 | Low et al. | |
| 2015/0025165 | A1 | 1/2015 | Chen et al. | |
| 2018/0127559 | A1 | 5/2018 | Takagi et al. | |
| 2018/0160767 | A1 | 6/2018 | Gopalan et al. | |
| 2019/0270861 | A1 | 9/2019 | Takagi et al. | |
| 2020/0164615 | A1 | 5/2020 | Yu et al. | |
| 2020/0199320 | A1 | 6/2020 | Hu et al. | |
| 2020/0270432 | A1 | 8/2020 | Kummer et al. | |

* cited by examiner

CE1 (non-XL, gel 0%)

CE2 (non-XL (Si-grafted), gel 2.3%)

IE6 (gel 49.2%)

IE7 (gel 69.6%)

SILANE CROSSLINKED ETHYLENE/α-OLEFIN BLOCK COPOLYMER BEAD FOAM

BACKGROUND

The present disclosure relates to crosslinked ethylene-based polymer foams.

Polyethylene foams are utilized in footwear components, such as midsole applications. Crosslinked ethylene-based polymers including ethylene vinyl acetate (EVA) copolymer and polyolefin elastomers have traditionally dominated the polyethylene foam market in footwear as they can easily be foamed with a chemical blowing agent. However, chemical blowing agents are known to produce unpleasant odors and contaminate molds. Such crosslinking chemical foaming process used in footwear industry is very labor intensive and thus alternative foaming technology with environmental and cost-saving process is pursued.

Bead foaming technology, one type of physical foaming, is an alternative foaming method that enables automation. The advantages of bead foaming technology compared to chemical foaming include: no unpleasant odor, less contamination to molds, recyclability, and isotropic properties of parts. However, not all polymers are suitable for bead foaming technology.

Crosslinked ethylene-based polymers to be used in bead foaming technology need to be of low density so they foam properly. Further, the polymers must remain stable at a high temperature, which is required to form a sintered foam structure, such as a foam midsole. The polymers also need to form a foam bead that does not shrink when subjected to a high temperature. Therefore, a crosslinked ethylene-based polymer composition that is of low density and remains stable at high temperatures is needed.

The art recognizes the need for a crosslinked ethylene-based polymer composition that exhibits suitable density for foaming. The art also recognizes the need for a crosslinked ethylene-based polymer composition that forms a foam bead structure that does not shrink when subjected to a high temperature.

SUMMARY

The present disclosure provides a process. The process includes (i) crosslinking pellets composed of a silane-grafted ethylene/α-olefin multi-block copolymer (Si-g-OBC) to a gel content from 10% to 80% to form crosslinked Si-g-OBC pellets; and (ii) foaming the crosslinked Si-g-OBC pellets to form crosslinked Si-g-OBC foam beads having a gel content from 10% to 80%.

The present disclosure also provides a foam bead formed from the present process. In an embodiment, the foam bead composed of crosslinked Si-g-OBC has a gel content of 10% to 80%; and the foam bead has a foam density of less than 0.200 g/cc.

DEFINITIONS

Figure 1:
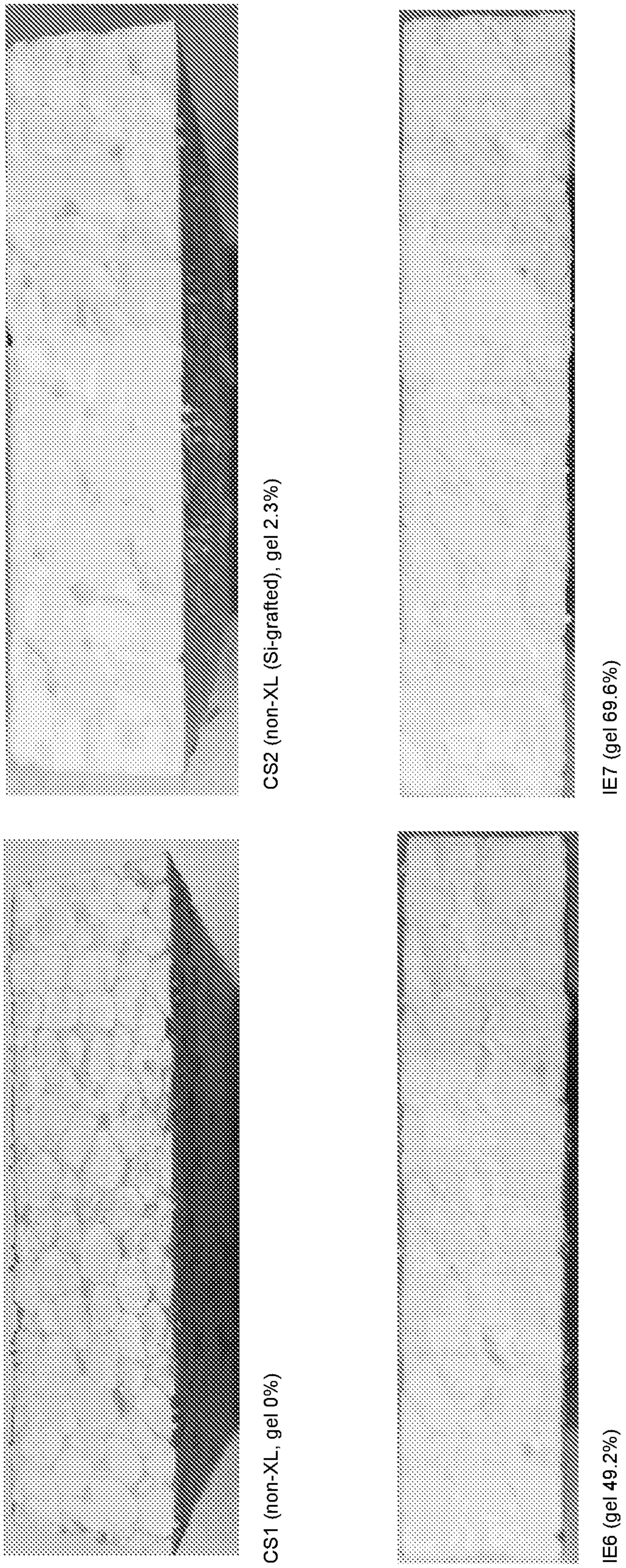
FIG. 1 are photographs of cross-section of the sintered plaques of foamed beads for comparative samples and inventive examples.

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2; or 3 to 5; or 6; or 7). The range 1-7 includes subranges of 1 to 2; 2 to 6; 5 to 7; 3 to 7; 5 to 6; etc.

Unless stated to the contrary, implicit from the context, or customary in the art, all parts and percents are based on weight and all test methods are current as of the filing date of this disclosure.

A "blowing agent" is a substance that is capable of producing a cellular structure in the composition via a foaming process.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In an embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers are characterized by unique distributions of both polymer polydispersity (PDI or Mw/Mn) and block length distribution, due to the effect of shuttling agent(s) in combination with the catalyst(s) employed in their preparation.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalentaryloxyether, phosphinimine, and others. Combinations of heterogeneous and/or homogeneous catalysts also may be used in either single reactor or dual reactor configurations.

The term "foam bead," as used herein, refers to a foamed polymer particle, formed by saturating a polymer particle (for example, pellet, granular particles, preferably pellet), in the presence of a blowing agent such as an inert gas (for example, $CO_2$ or $N_2$), and at a temperature within ±30° C. of the highest melting temperature (Tm) of the polymer particle, and at a pressure from 50 Bar to 200 Bar. The saturation typically occurs for a time, such that the diameter of the polymer particle increases by at least 50%, or at least 60%, or at least 70%, or at least 80%, or at least 90%, or at least 100%, relative to its original diameter before foaming. Typically, a saturation time is from 0.1 to 2.0 hours.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

An "olefin-based polymer" or "polyolefin" is a polymer that contains more than 50 weight percent polymerized olefin monomer (based on total amount of polymerizable monomers), and optionally, may contain at least one comonomer. A nonlimiting example of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably.

"Sintering" is a process of compacting and forming a mass of fused foam beads by heat and/or pressure into an article, without melting the beads to the point of liquefaction.

The term, "sintered foam structure," refers to a foam structure formed by compressing foam beads, as described herein, typically under a vacuum, in the presence of a heating source. Typically, the heating source is steam at a steam pressure equal to, or greater than, 0.5 Bar. The filling of a mold is typically done using a vacuum, such as at a pressure of less than 1 atm.

Test Methods

Asker C Hardness of sintered foam structures was measured in accordance with ASTM D2240 on plaques with the dimensions 20 cm (length)×10 cm (width)×1-2 cm (thickness) (original sintered foam structure with two skin layers). One sample was tested for each example. Each sample was measured at least three times (with a 5 second latency between each measurement), across the surface of the sample (i.e., different positions along the sample). The average was recorded.

Melt index (MI) (I2) in g/10 min is measured in accordance with ASTM D1238 (190° C./2.16 kg). The result is reported in grams eluted per 10 minutes (g/10 min).

Differential Scanning Calorimetry (DSC)

Differential Scanning Calorimetry (DSC) is used to measure the melting, crystallization, and glass transition behavior of a polymer over a wide range of temperature. For example, the TA Instruments Q2000 DSC, equipped with an RCS (refrigerated cooling system) and an autosampler was used to perform this analysis. During testing, a nitrogen purge gas flow of 50 ml/min was used. Each sample was melt pressed into a thin film at 190° C.; the melted sample was then air-cooled to room temperature (25° C.). A 3-10 mg, 6 mm diameter specimen was extracted from the cooled polymer, weighed, placed in a light aluminum pan (50 mg), and crimped shut. Analysis was then performed to determine its thermal properties.

The thermal behavior of the sample was determined by ramping the sample temperature up and down to create a heat flow versus temperature profile. First, the sample was heated at 10.00° C./minute to 200.0° C. and held isothermal for 5 minutes in order to remove its thermal history. Next, the sample was cooled to −80° C. at a 10° C./minute cooling rate and held isothermal at −80° C. for 5 minutes. The sample was then heated to 200° C. (this is the "second heat" ramp) at a 10° C./minute heating rate. The cooling and second heating curves were recorded. The values determined are extrapolated onset of melting, $T_m$, and extrapolated onset of crystallization, $T_c$. Heat of fusion ($H_f$) (in Joules per gram), and the calculated % crystallinity for polyethylene samples using the following Equation: % Crystallinity=(($H_f$)/292 J/g)×100.

The heat of fusion ($H_f$) (also known as melt enthalpy) and the peak melting temperature were reported from the second heat curve.

Melting point, $T_m$, was determined from the DSC heating curve by first drawing the baseline between the start and end of the melting transition. A tangent line was then drawn to the data on the low temperature side of the melting peak. Where this line intersects the baseline is the extrapolated onset of melting ($T_m$). This is as described in Bernhard Wunderlich, *The Basis of Thermal Analysis, in Thermal Characterization of Polymeric Materials* 92, 277-278 (Edith A. Turi ed., 2d ed. 1997).

Foam density is measured in accordance with ASTM D792-00 involving weighing polymer foam in water using a sinker. The result is recorded in g/cc.

Foam density of sintered foam structures is measured by weighing a plaque with the dimensions 20 cm (length)×10 cm (width)×1-2 cm (thickness) (original sintered foam structure with two skin layers), in grams, and determining the volume (in cubic centimeter, $cm^3$) of the plaque using the length, width, and thickness of the plaque. The result (weight/volume) is recorded in $g/cm^3$ (g/cc).

Gel content is obtained in the following manner. A specimen of pellets or beads is placed into a 120-mesh metallic mesh bag and boiled in 600 ml xylene for 5 hours. The total weight of pellets or beads in 600 ml xylene is about 2 g. After boiling for 5 hours, the mesh bags are taken out and dried in vacuum oven at 120° C. for 2 hours, and then weighed. The result is recorded in percent (%), based on the total weight of the material. The percent gel normally increases with increasing crosslinking levels.

Dynamic Mechanical Analysis (DMA) test for energy loss characterization. Instrument: RSA-G2, TA Instruments. Geometry: compression fixture, 15 mm disc. Method Frequency sweep, Frequency: 0.1~100 rad/s, Temperature: 25° C., Strain: 10%. During the DMA test, Tan(delta) is recorded, which is the ratio of loss modulus and storage modulus, and thus an elasticity characterization.

Dynamic compression set test (with skins on): Equipment: MTS 810.

The sintered plaques of bead foams are used for dynamic compression set test with the following test conditions: Compression strain: 50%, Compression area size: Ø050 mm, Compression frequency 1 Hz, Preload: 5 N, Cycles: 10,000 cycles, testing temperature: 23° C. After 10,000 cycles, the plaques are quickly detached from MTS plate and cut along the diameter of compression circular area. After 1 minute, the thickness of compressed plaques are measured using Vernier caliper. The ratio of the thickness at 1 min to the original plaque thickness is defined as the immediate recovery ratio (thus the immediate compression set=2*(1−immediate recovery ratio)). The recovery ratio with time is obtained by measuring the thickness after a certain period of time.

DETAILED DESCRIPTION

The present disclosure provides a process. The process includes (i) crosslinking pellets composed of a silane-grafted ethylene/α-olefin multi-block copolymer (Si-g-OBC) to a gel content from 10% to 80% to form crosslinked Si-g-OBC pellets; and (ii) foaming the crosslinked Si-g-OBC pellets to form crosslinked Si-g-OBC foam beads having a gel content from 10% to 80%.

(a) Base Ethylene/α-Olefin Multi-Block Copolymer

The present process includes crosslinking pellets composed of silane grafted ethylene/α-olefin multi-block copolymer. The base polymer is an ethylene/α-olefin multi-block copolymer.

The term "ethylene/α-olefin multi-block copolymer" refers to an ethylene/$C_4$-$C_8$ α-olefin multi-block copolymer consisting of ethylene and one copolymerizable $C_4$-$C_8$ α-olefin comonomer in polymerized form, the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Base ethylene/α-olefin multi-block copolymer includes block copolymer with two blocks (di-block) and more than two blocks (multi-block). The $C_4$-$C_8$ α-olefin is selected from butene, hexene, and octene. The base ethylene/α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the base ethylene/α-olefin multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the base ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole base ethylene/α-olefin multi-block copolymer, i.e., ethylene comprises at least 50 wt % of the whole base ethylene/α-olefin multi-block copolymer. More preferably, ethylene comprises at least 60 wt %, at least 70 wt %, or at least 80 wt %, with the substantial remainder of the whole base ethylene/α-olefin multi-block copolymer comprising the $C_4$-$C_8$ α-olefin comonomer. In an embodiment, the base ethylene/α-olefin multi-block copolymer contains from 50 wt %, or 60 wt %, or 65 wt % to 80 wt %, or 85 wt %, or 90 wt % ethylene. For many base ethylene/octene multi-block copolymers, the composition comprises an ethylene content greater than 80 wt % of the whole base ethylene/octene multi-block copolymer and an octene content of from 10 wt % to 15 wt %, or from 15 wt % to 20 wt % of the whole base ethylene/octene multi-block copolymer.

The base ethylene/α-olefin multi-block copolymer includes various amounts of “hard” segments and “soft” segments. “Hard” segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. “Soft” segments are blocks of polymerized units in which the comonomer content (content of monomers other than ethylene) is greater than 5 wt %, or greater than 8 wt %, or greater than 10 wt %, or greater than 15 wt %, based on the weight of the polymer. In an embodiment, the comonomer content in the soft segments is greater than 20 wt %, or greater than 25 wt %, or greater than 30 wt %, or greater than 35 wt %, or greater than 40 wt %, or greater than 45 wt %, or greater than 50 wt %, or greater than 60 wt % and can be up to 100 wt %.

The soft segments can be present in the base ethylene/α-olefin multi-block copolymer from 1 wt %, or 5 wt %, or 10 wt %, or 15 wt %, or 20 wt %, or 25 wt %, or 30 wt %, or 35 wt %, or 40 wt %, or 45 wt % to 55 wt %, or 60 wt %, or 65 wt %, or 70 wt %, or 75 wt %, or 80 wt %, or 85 wt %, or 90 wt %, or 95 wt %, or 99 wt % of the total weight of the base ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, the disclosure of which is incorporated by reference herein in its entirety. In particular, hard and soft segment weight percentages and comonomer content may be determined as described in column 57 to column 63 of U.S. Pat. No. 7,608,668.

The base ethylene/α-olefin multi-block copolymer comprises two or more chemically distinct regions or segments (referred to as “blocks”) joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present base ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the base ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the base ethylene/α-olefin multi-block copolymer possesses Mw/Mn from 1.0 to 3.5, or from 1.3 to 3, or from 1.4 to 2.5, or from 1.4 to 2.

In addition, the base ethylene/α-olefin multi-block copolymer possesses a PDI (or Mw/Mn) fitting a Schultz-Flory distribution rather than a Poisson distribution. The present base ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp. 9234-9238.

In an embodiment, the present base ethylene/α-olefin multi-block copolymer possesses a most probable distribution of block lengths.

Nonlimiting examples of suitable base ethylene/α-olefin multi-block copolymer are disclosed in U.S. Pat. No. 7,608,668, the entire content of which is incorporated by reference herein.

In an embodiment, the base ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship: $Tm>-2002.9+4538.5(d)-2422.2(d)^2$, where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 122° C., or 125° C., or 130° C., or 135° C.

In an embodiment, the base ethylene/α-olefin multi-block copolymer has a density from 0.850 g/cc, or 0.860 g/cc, or 0.865 g/cc, or 0.870 g/cc to 0.877 g/cc, or 0.880 g/cc, or 0.900 g/cc. In another embodiment, the base ethylene/α-olefin multi-block copolymer has a density from 0.850 g/cc to 0.900 g/cc, or from 0.865 g/cc to 0.900 g/cc, or from 0.865 g/cc to 0.890 g/cc.

In an embodiment, the base ethylene/α-olefin multi-block copolymer has a melting point, Tm, from 110° C., or 115° C., or 120° C. to 122° C., or 125° C., or 130° C., or 135° C. In another embodiment, the base ethylene/α-olefin multi-block copolymer has a melting point, Tm, from 110° C. to 135° C., or from 115° C. to 130° C., or from 120° C. to 130° C.

In an embodiment, the base ethylene/α-olefin multi-block copolymer has a melt index (12) from 0.1 g/10 min, or 0.5 g/10 min to 1.0 g/10 min, or 2.0 g/10 min, or 5 g/10 min, or 10 g/10 min, or 50 g/10 min. In another embodiment, the base ethylene/α-olefin multi-block copolymer has a melt index (12) from 0.1 g/10 min to 50 g/10 min, or from 0.5 g/10 min to 10 g/10 min, or from 0.5 g/10 min to 5 g/10 min.

In an embodiment, the base ethylene/α-olefin multi-block copolymer is a base ethylene/1-octene multi-block copolymer (consisting only of ethylene and octene comonomer) and has one, some, or all of the following properties: (i) a Mw/Mn from 1.7, or 1.8 to 2.2, or 2.5, or 3.5; and/or (ii) a density from 0.850 g/cc, or 0.860 g/cc, or 0.865 g/cc, or 0.870 g/cc to 0.877 g/cc, or 0.880 g/cc, or 0.900 g/cc; and/or (iii) a melting point, Tm, from 115° C., or 118° C., or 119° C., or 120° C. to 121° C., or 122° C., or 125° C.; and/or (iv) a melt index (12) from 0.1 g/10 min, or 0.5 g/10 min to 1.0 g/10 min, or 2.0 g/10 min, or 5 g/10 min, or 10 g/10 min, or 50 g/10 min; and/or (v) 50-85 wt % soft segment and 50-15 wt %, or 40-15 wt % hard segment; and/or (vi) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment; and/or (vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (viii) an elastic recovery (Re) from 50%, or 60% to 70%, or 80%, or 90%, at 300% $min^{-1}$ deformation rate at 21° C. as measured in accordance with ASTM D1708; and/or (ix) a polydisperse distribution of blocks and a polydisperse distribution of block sizes; and/or (x) a Shore A hardness from 50, or 60, or 65, or 70, or 75 to 80, or 85, or 90. In a further embodiment, the base ethylene/1-octene multi-block copolymer has all of the above properties (i)-(x).

In an embodiment, the base ethylene/α-olefin multi-block copolymer is a base ethylene/octene multi-block copolymer. The base ethylene/octene multi-block copolymer is sold under the tradename INFUSE™, available from The Dow Chemical Company, Midland, Michigan, USA.

The base ethylene/α-olefin multi-block copolymer, may comprise two or more embodiments discussed herein.

(b) Hydrolyzable Silane Monomer

The present process includes the provision of a silane-grafted ethylene/α-olefin multi-block copolymer. In other words, a silane is grafted onto the base ethylene/α-olefin multi-block copolymer.

In an embodiment, the silane is a hydrolysable silane monomer. A "hydrolyzable silane monomer" is a silane-containing monomer that will graft to the base ethylene/α-olefin multi-block copolymer to form a silane-grafted ethylene/α-olefin multi-block copolymer.

The hydrolyzable silane monomer has the following Structure (1):

Structure (1)

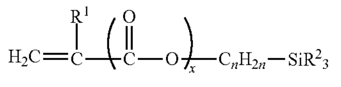

in which $R^1$ is a hydrogen atom or methyl group; x is 0 or 1; n is an integer from 0, or 1 to 4, or 6, or 8, or 10, or 12; and each $R^2$ independently is a hydrolyzable organic group such as an alkoxy group having from 1 to 12 carbon atoms (e.g., methoxy, ethoxy, butoxy), an aryloxy group (e.g., phenoxy), an araloxy group (e.g., benzyloxy), an aliphatic acyloxy group having from 1 to 12 carbon atoms (e.g., formyloxy, acetyloxy, propanoyloxy), an amino or substituted amino group (e.g., alkylamino, arylamino), or a lower-alkyl group having 1 to 6 carbon atoms, with the proviso that not more than one of the three $R^2$ groups is an alkyl.

The hydrolyzable silane monomer may be grafted to the base ethylene/α-olefin multi-block copolymer by the use of a suitable quantity of organic peroxide, such as 2,5-dimethyl-2,5,-di-(tert-butylperoxy)hexane, to form a silane-grafted ethylene/α-olefin multi-block copolymer.

Nonlimiting examples of suitable hydrolyzable silane monomer include silane monomers that comprise an ethylenically unsaturated hydrocarbyl group, such as a vinyl, allyl, isopropenyl, butenyl, cyclohexenyl or gamma (meth) acryloxy allyl group, and a hydrolyzable group, such as, for example, a hydrocarbyloxy, hydrocarbonyloxy, or hydrocarbylamino group. Nonlimiting examples of suitable hydrolyzable groups include methoxy, ethoxy, formyloxy, acetoxy, proprionyloxy, and alkyl or arylamino groups. In an embodiment, the hydrolyzable silane monomer is an unsaturated alkoxy silane, which can be grafted onto the base ethylene/α-olefin multi-block copolymer. These hydrolyzable silane monomers and their method of preparation are more fully described in U.S. Pat. No. 5,266,627, incorporated herein by reference. Nonlimiting examples of suitable hydrolyzable silane monomer include vinyltrimethoxysilane (VTMS), vinyltriethoxysilane (VTES), vinyltriacetoxysilane, and gamma-(meth)acryloxy propyl trimethoxy silane.

Nonlimiting examples of suitable organic peroxides include bis(t-butylperoxy)diisopropylbenzene (BIBP), dialkyl peroxide, and combinations thereof. Nonlimiting examples of suitable dialkyl peroxides include dicumyl peroxide; di-t-butyl peroxide; t-butyl cumyl peroxide; 2,5-dimethyl-2,5-di(tert-butylperoxy)-hexane; 2,5-dimethyl-2,5-di(tert-amylperoxy)-hexane; 2,5-dimethyl-2,5-di(tert-butylperoxy)hexyne-3,2,5-dimethyl-2,5-di(tert-amylperoxy)hexyne-3; a,a-di[(tert-butylperoxy)-isopropyl]-benzene; di-t-amyl peroxide (DTAP); 1,3,5-tri-[(tert-butylperoxy)-isopropyl] benzene; 1,3-dimethyl-3-(tert-butylperoxy)butanol; 1,3-dimethyl-3-(tert-amylperoxy) butanol; and combinations thereof.

In an embodiment, the peroxide is 2,5-dimethyl-2,5-di (tert-butylperoxy)-hexane.

In an embodiment, the hydrolyzable silane monomer is VTMS and the ethylene/α-olefin multi-block copolymer is an ethylene/octene multi-block copolymer.

A. Silane-Grafted Ethylene/α-Olefin Multi-Block Copolymer (Si-g-OBC).

The present composition includes a silane-grafted ethylene/α-olefin multi-block copolymer (Si-g-OBC). A "silane-grafted ethylene/α-olefin multi-block copolymer" is an ethylene/α-olefin multi-block copolymer with a hydrolysable silane monomer covalently bonded thereto. The hydrolysable silane monomer may be bonded pendant to the polymer chain, or bonded within the polymer chain. In an embodiment, the Si-g-OBC is formed by a process such as the Sioplas process, in which a hydrolyzable silane monomer (such as a vinyl silane monomer) is grafted onto the backbone of a base ethylene/α-olefin multi-block interpolymer by a process such as extrusion, prior to the interpolymer's incorporation into the present foam bead, as described, for example, in U.S. Pat. Nos. 3,225,018 and 4,574,133, each incorporated herein by reference.

In an embodiment, the Si-g-OBC contains from 0.1 wt %, or 0.5 wt %, to 1.0 wt %, or 1.05 wt %, or 1.1 wt %, or 1.2 wt % to 1.5 wt %, or 2.0 wt %, or 3.0 wt %, or 4.0 wt %, or 5.0 wt % silane, based on the total weight of the Si-g-OBC. In another embodiment, the Si-g-OBC contains from 0.1 wt % to 5.0 wt %, or from 0.5 wt % to 3.0 wt %, or from 0.5 wt % to 2.0 wt % silane, or from 0.5 wt % to 1.2 wt % silane, based on the total weight of the Si-g-OBC.

In an embodiment, the process includes the step of pelletizing the Si-g-OBC. The pellet may have a diameter from 2.0 mm, or 2.3 mm to 3.0 mm, or 3.5 mm and a length from 2.0 mm, or 2.3 mm to 3.0 mm, or 3.5 mm. In an embodiment, the Si-g-OBC is in the form of pellets, each pellet having a diameter from 2.3 mm to 3.0 mm and a length from 2.3 mm to 3.0 mm.

i. Crosslinking Pellets Composed of Si-g-OBC to a Gel Content from 10% to 80%.

The process includes crosslinking the Si-g-OBC pellets to a gel content from 10% to 80%. The Si-g-OBC is crosslinked by way of a crosslinking agent.

A "crosslinking agent" is an agent capable of forming Si—O—Si linkages across the polymer chains of the Si-g-OBC, thereby crosslinking the polymer. Non-limiting examples of suitable crosslinking agents include water (e.g., steam, liquid form). The crosslinking process may be aided by a catalyst. A non-limiting example of a suitable catalyst for crosslinking includes dibutyltin dilaurate in a solvent.

In an embodiment, the crosslinking occurs prior to foam bead formation.

In an embodiment, crosslinking comprises hydrolytically crosslinking the Si-g-OBC pellets by immersing the pellets of Si-g-OBC in water. In an embodiment, the Si-g-OBC pellets are immersed in water at a temperature from 50° C., or 60° C., or 65° C., or 70° C. to 80° C., or 95° C. In another embodiment, the Si-g-OBC pellets are immersed in water of temperature from 50° C. to 95° C., or from 65° C. to 85° C., or from 70° C. to 80° C. In an embodiment, the Si-g-OBC pellets are immersed in 70° C. water. The gel content is controlled by controlling the immersion time of the Si-g-OBC pellets in water.

In an embodiment, the process includes immersing the pellets of Si-g-OBC in water at a temperature from 50° C. to 95° C., or from 60° C. to 90° C., or from 70° C. to 85° C. for a duration from 1 day to 7 days, or from 2 days to 7 days, or from 3 days to 7 days and crosslinking the Si-g-OBC pellets to a gel content from 10% to 80%, or from 20% to 75%, or from 30% to 70%, or from 35% to 65%.

In an embodiment, the process includes catalytically crosslinking the Si-g-OBC pellets by soaking the pellets of Si-g-OBC with a dibutyl tin solution to obtain soaked Si-g-OBC pellets (catalytic crosslinking). In an embodiment, the Si-g-OBC pellets are soaked with from 0.1 wt %, or 0.2 wt %, or 0.3 wt %, or 0.4 wt %, or 0.5 wt % to 0.6 wt %, or 0.65 wt %, or 0.7 wt %, or 0.8 wt %, or 0.9 wt %, or 1.0 wt % of dibutyl tin solution based on the weight of the Si-g-OBC pellets. In another embodiment, the Si-g-OBC pellets are soaked with a dibutyl tin solution of from 0.1 wt % to 1.0 wt %, or from 0.3 wt % to 0.8 wt %, or from 0.5 wt % to 0.7 wt % based on the weight of the Si-g-OBC pellets. In an embodiment, the soaked Si-g-OBC pellets are subsequently exposed to air for from 5 days, or 6 days to 7 days, or 8 days.

In an embodiment, the process includes soaking the pellets of Si-g-OBC in from 0.1 wt %, or 0.2 wt %, or 0.3 wt %, or 0.4 wt %, or 0.5 wt % to 0.6 wt %, or 0.65 wt %, or 0.7 wt %, or 0.8 wt %, or 0.9 wt %, or 1.0 wt % of dibutyl tin solution based on the weight of the Si-g-OBC pellets for a duration from 1 minute, or 2 minutes, or 3 three minutes to 4 minutes, or 5 minutes followed by exposing the soaked pellets to air for a duration from 5, or 6 to 7, or 8 days and crosslinking the Si-g-OBC pellets to a gel content from 10% to 80%, or from 20% to 75%, or from 30% to 70%, or from 35% to 65%.

In an embodiment, crosslinked Si-g-OBC has a gel content from 10% to 80%. In another embodiment, the crosslinked Si-g-OBC has a gel content from 20% to 75%, or from 30% to 70%, or from 35% to 65%, or from 35% to 70%.

The crosslinked Si-g-OBC gel content of 10% to 80% is obtained before the foaming step. In an embodiment, the gel content of 10%-80% for the Si-g-OBC is obtained from at least 1 minute, or at least 2 minutes, or at least 3 minutes, or at least 4 minutes, or at least 5 minutes before the foaming step is performed.

In an embodiment, the Si-g-OBC contains from 0.1 wt %, or 0.5 wt %, to 1.0 wt %, or 1.05 wt %, or 1.1 wt %, or 1.2 wt % to 1.5 wt %, or 2.0 wt %, or 3.0 wt %, or 4.0 wt %, or 5.0 wt % silane, based on the total weight of Si-g-OBC; and/or a gel content from 10% to 80%, or from 20% to 75%, or from 30% to 70%, or from 35% to 65%, or from 35% to 70%, and the Si-g-OBC has one, some, or all of the following properties:

(a) a melting point, Tm, from 110° C., or 115° C., or 117° C., or 118° C., to 119° C., or 120° C., or 121° C., or 122° C., or 123° C., or 124° C., or 125° C.; and/or (b) a melt index (I2) from 0.05 g/10 min, or 0.10 g/10 min, or 0.50 g/10 min to 1.0 g/10 min, or 2.0 g/10 min, or 2.5 g/10 min, or 3.0 g/10 min, or 4.0 g/10 min, or 5.0 g/10 min; and/or (c) a heat of fusion, $H_f$, from 40 J/g, or 50 J/g, or 60 J/g, to 64 J/g, or 65 J/g, or 66 J/g, or 67 J/g, or 70 J/g, or 75 J/g, or 80 J/g.

The Si-g-OBC may comprise two or more embodiments disclosed herein.

Applicant discovered Si-g-OBCs that have a gel content of greater than 80% cannot be melt processed to form a structure because the Si-g-OBCs cannot melt together and fuse to form a single uniform structure.

ii. Foaming the Crosslinked Si-g-OBC Pellets to Form Si-g-OBC Foam Beads having a Gel Content from 10% to 80%.

The process includes foaming the crosslinked Si-g-OBC with a blowing agent to form a foam bead having a gel content from 10% to 80%. The crosslinked Si-g-OBC may be any Si-g-OBC disclosed herein.

A "blowing agent" is a substance that is capable of producing a cellular structure in the composition via a foaming process. A nonlimiting example of a suitable blowing agent is a physical blowing agent. Nonlimiting examples of suitable physical blowing agents include an inert gas such as nitrogen ($N_2$), a carbon gas (e.g., CO, $CO_2$, etc.), helium, and argon; hydrocarbon such as methane, propane, and butane (e.g., isobutane), pentane; and halogenated hydrocarbons such as dichlorodifluoromethane, dichloromonofluoromethane, monochlorodifluoromethane, trichloromonofluoromethane, monochloropentafluoroethane, and trichlorotrifluoroethane.

In an embodiment, the physical blowing agent is carbon dioxide ($CO_2$). A nonlimiting example of a suitable carbon dioxide is supercritical carbon dioxide. Supercritical carbon dioxide is a fluid state of carbon dioxide that is held at or above its critical temperature (31.10° C.) and critical pressure (7.39 MPa).

In an embodiment, the blowing agent is a physical blowing agent to the exclusion of chemical blowing agents.

Nonlimiting examples of methods for contacting the Si-g-OBC pellets with a blowing agent to form foam beads include (a) contacting the composition with a blowing agent, and undergoing a sudden pressure drop (depressurization) or a temperature increase of the contacted composition in an autoclave to form the foam beads, and (b) via foam extrusion with under-water pelletizing.

A "foam composition" is a polymeric composition with a cellular structure. In other words, in its native state and prior to contact with the blowing agent, the polymeric composition is void of a cellular structure, and after contact with the blowing agent and depressurization, the polymeric composition is a foam composition with a cellular structure. The cells may be open cells, closed cells, or combinations thereof. In an embodiment, the cells have a uniform, or substantially uniform, cell size.

A "foam bead" is a foamed structure containing the crosslinked Si-g-OBC, the foam bead having a diameter from 4 mm, or 5 mm to 6 mm, or 7 mm; and a length from 4 mm, or 5 mm to 6 mm, or 7 mm.

In an embodiment, the blowing agent is present in an amount of from 0.001 parts by weight, or 0.005 parts by weight, to 0.05 parts by weight, or 0.10 parts by weight of the composition to be foamed. In another embodiment, the blowing agent is present in an amount of from 0.1 wt, or 0.5 wt, or 1.0 wt to 2.0 wt, or 5.0 wt, or 8.0 wt, or 10.0 wt, based on the combined weight of the composition and blowing agent.

In an embodiment, the process includes contacting the pellets of Si-g-OBC with a gel content from 10% to 80% with the physical blowing agent at a temperature of from 100° C., or 110° C., or 115° C., or 120° C. to 125° C., or 130° C., or 135° C.

In an embodiment, the pellets of Si-g-OBC crosslinked to a gel content from 10% to 80% are contacted with the physical blowing agent (e.g., supercritical carbon dioxide) by soaking the pellets of crosslinked Si-g-OBC in the physical blowing agent.

In an embodiment, the pellets of Si-g-OBC crosslinked to a gel content from 10% to 80% are contacted with the physical blowing agent (e.g., supercritical carbon dioxide) via impregnation of the pellets with the blowing agent in an autoclave. The impregnating occurs at a temperature within ±0° C. to ±10° C., or ±30° C. of the melting point of the ethylene/α-olefin multi-block copolymer. In a further embodiment, the impregnating occurs at a temperature from 95° C., or 100° C., or 105° C., or 115° C., or 120° C. to 125° C., or 130° C., or 135° C. In an embodiment, the impregnating occurs with a physical blowing agent at a pressure from 5 MPa, or 8 MPa, or 10 MPa, or 11 MPa to 12 MPa, or 13 MPa, or 15 MPa, or 20 MPa, or 25 MPa, or 30 MPa and a saturation time of from 0.5 hours, or 1.0 hour to 1.5 hours, or 2.0 hours, or 3.0 hours. Following the saturation time, the autoclave is depressed to 25° C. and 0.1 MPa. During depression, the impregnated composition pellets expand to form foam beads containing the crosslinked Si-g-OBC.

In an embodiment, the pellets of Si-g-OBC are crosslinked to a gel content from 10% to 80% before the foaming step begins.

In an embodiment, the foam bead composed of Si-g-OBC having a gel content from 10% to 80% has a density of less than 0.200 g/cc. In another embodiment, the foam bead has a foam density from 0.120 g/cc, or 0.125 g/cc, to 0.130 g/cc, or 0.135 g/cc, or 0.140 g·cc, or 0.150 g/cc, or 0.180 g/cc, or 0.185 g/cc, or 0.188 g/cc, or 190 g/cc, or 0.195 g/cc, or 0.199 g/cc. All other features being equal, a lower foam density indicates a composition has improved foaming ability.

In an embodiment, the foam bead is formed from pellets of crosslinked Si-g-OBC having a gel content from 10% to 80%, or from 20% to 75%, or from 30% to 70%, or from 35% to 65%.

In an embodiment, the foam bead composed of crosslinked Si-g-OBC with a gel content from 10% to 80% has a melt index from 0 g/10 min, or 0.01 g/10 min, or 0.20 g/10 min to 0.30 g/10 min, or 0.5 g/10 min, or 1 g/10 min, or 1.05 g/10 min, or 1.10 g/10 min, or 1.20 g/10 min, or 1.3 g/10 min, or 1.4 g/10 min.

In an embodiment, the foam bead has at least one melting point, $T_m$, from 110° C., or 115° C., to 120° C., or 125° C., or 130° C., or 135° C.

In an embodiment, the foam bead composed of crosslinked Si-g-OBC with a gel content from 10% to 80% has a heat fusion, $H_f$, from 40 J/g, or 50 J/g, or 60 J/g, to 64 J/g, or 65 J/g, or 66 J/g, or 67 J/g, or 70 J/g, or 75 J/g, or 80 J/g. In another embodiment, the foam bead, has a heat of fusion, $H_f$, from 40 J/g to 80 J/g, or from 50 J/g to 75 J/g, or from 55 J/g to 70 J/g.

In an embodiment, the foam bead contains, consists essentially of, or consists solely of, the crosslinked Si-g-OBC, and, optionally, an additive, and the crosslinked Si-g-OBC has one, some, or all of the following properties:

(a) a gel content of 10% to 80%, or from 20% to 75%, or from 30% to 70%, or from 35% to 65%; and the foam bead has one, some, or all of the following properties:

(i) a density of less than 0.200 g/cc or from 0.120 g/cc to 0.140 g/cc, or from 0.125 g/cc to 0.135 g/cc; and/or (ii) a melting temperature from 117° C. to 121.5° C.; and/or (iii) a heat of fusion, $H_f$ in J/g, from 63 to 65.

In an embodiment, the foam bead contains, consists essentially of, or consists solely of, the crosslinked Si-g-OBC, and, optionally, an additive, and the foam bead has one, some, or all of the following properties:

(a) a gel content of 10% to 80%, or 20% to 75%, or 30% to 70%, or 35% to 65%, or 35% to 70%; and (i) a density from 0.120 g/cc, or 0.125 g/cc, to 0.130 g/cc, or 0.135 g/cc, or 0.140 g·cc, or 0.150 g/cc, or 0.180 g/cc, or 0.185 g/cc, or 0.188 g/cc, or 190 g/cc, or 0.195 g/cc, or 0.199 g/cc; and/or (ii) a melting temperature from 110° C., or 115° C., to 120° C., or 125° C., or 130° C., or 135° C.; and/or (iii) a heat of fusion, $H_f$ in J/g, from 40 J/g, or 50 J/g, or 60 J/g, to 64 J/g, or 65 J/g, or 66 J/g, or 67 J/g, or 70 J/g, or 75 J/g, or 80 J/g.

The present disclosure also provides a foam bead formed from the present process. The foam bead may be any foam bead disclosed herein. In an embodiment, the foam bead composed of crosslinked Si-g-OBC has a gel content of 10% to 80%; and the foam bead has a foam density of less than 0.200 g/cc.

The step of contacting the pellets of crosslinked Si-g-OBC with a blowing agent to form a foam composition may comprise two or more embodiments discussed herein.

The step of forming foam beads containing the foam composition may comprise two or more embodiments discussed herein.

Sintering the Crosslinked Si-g-OBC Foam Beads to Form a Sintered Foam Article

In an embodiment, the process includes sintering the crosslinked Si-g-OBC foam beads and forming a sintered foam article.

The sintered foam article is formed via sintering of the crosslinked Si-g-OBC foam beads. A nonlimiting method of sintering includes steam-chest molding. Steam-chest molding occurs at a temperature from 80° C., or 90° C. to 100° C., or 110° C. and/or a pressure from 0.1 MPa, or 0.2 MPa to 1.0 MPa, or 1.2 MPa. Bounded by no particular theory, it is believed that the high melting temperature (110° C. to 125° C.) of the Si-g-OBC and/or the high melting temperature (110° C. to 125° C.) of the base ethylene/α-olefin multi-block copolymer enables the foam beads to withstand the high temperature of steam-chest molding without shrinkage (i.e., without an increase in foam density). In contrast, foam beads formed from polymers with lower melting points, such as ethylene vinyl acetate copolymer (e.g., TAISOX™ 7360M with a melting point of 80° C., available from Formosa Plastics Corporation) and polyolefin elastomers (e.g., ENGAGE™ 8003 with a melting point of 77° C., available from The Dow Chemical Company), are known to exhibit shrinkage (i.e., an increase in foam density) due to steam-chest molding.

In an embodiment, the sintered foam article is formed from foam beads composed of crosslinked Si-g-OBC having a gel content from 10% to 80%. In an embodiment, the sintered foam article is formed from foam beads composed of crosslinked Si-g-OBC having a gel content from 20% to 75%, or from 30% to 70%, or from 35% to 65%.

In an embodiment, the sintered foam article composed of foam beads composed of crosslinked Si-g-OBC has a density of less than 0.250 g/cc. In another embodiment, the sintered foam article has a density from 0.120 g/cc, or, or 0.140 g·cc, or 0.150 g/cc, or 0.170 g/cc, or 0.180 g/cc, to 0.185 g/cc, or 190 g/cc, or 0.195 g/cc, or 0.200 g/cc, or 0.210 g/cc, or 0.220 g/cc, or 0.230 g/cc or 0.240 g/cc, or 0.245 g/cc, or 0.249 g/cc.

In an embodiment, the sintered foam article composed of foam beads composed of crosslinked Si-g-OBC has a dynamic recovery ratio from 50%, or 55%, or 60%, or 61% to 62%, or 70%, or 80%, or 90%, or 100%. In another embodiment, the sintered foam article has a dynamic recovery ratio from 50% to 100%, or from 60% to 100%, or from 70% to 100%, or from 80% to 100%, or from 85% to 95%.

In an embodiment, the sintered foam article composed of foam beads composed of crosslinked Si-g-OBC has a hardness, measured according to Asker C, from 35.0, or 36.0, or 39.0, to 40.0, or 40.5, or 41.0, or 42.0, or 43.0, or 45.0, or 49.0, or 50.0, or 51.0, or 55.0. In another embodiment, the sintered foam article has a hardness, measured according to Asker C, from 35.0 to 55.0, or 39.0 to 51.0, or 40.0 to 41.0.

In an embodiment, the sintered foam article composed of foam beads composed of crosslinked Si-g-OBC and gel content from 10% to 80% has one, some, or all of the following properties:

(i) a hardness from 40.0 to 41.0 measured according to Asker C; and/or (ii) a density from 0.190 g/cc to 0.210 g/cc; and/or (iii) a dynamic recovery ratio, measured at 1 min, from 87.0% to 100%.

In an embodiment, the sintered article contains, consists essentially of, or consists solely of, the crosslinked Si-g-OBC foamed beads, and, optionally, an additive, and the crosslinked Si-g-OBC foam beads have one, some, or all of the following properties:

(a) a gel content of 10% to 80%, or 20% to 75%, or 30% to 70%, or 35% to 65%, or 35% to 70%; and the sintered foam article containing the Si-g-OBC foamed beads has one or more of the following properties:

(i) a hardness, measured according to Asker C, from 35.0, or 36.0, or 39.0, to 40.0, or 40.5, or 41.0, or 42.0, or 43.0, or 45.0, or 49.0, or 50.0, or 51.0, or 55.0; and/or (ii) a density from 0.120 g/cc, or, or 0.140 g·cc, or 0.150 g/cc, or 0.170 g/cc, or 0.180 g/cc to 0.185 g/cc, or 190 g/cc, or 0.195 g/cc, or 0.200 g/cc, or 0.210 g/cc, or 0.220 g/cc, or 0.230 g/cc or 0.240 g/cc, or 0.245 g/cc, or 0.249 g/cc; and/or (iii) a dynamic recovery ratio from 50%, or 55%, or 60%, or 61% to 62%, or 70%, or 80%, or 90%, or 100%.

In an embodiment, the sintered foam article is formed from foam beads composed of a crosslinked Si-g-OBC having a gel content from 35% to 65%, and the sintered foam article has a dynamic recovery ratio from 92% to 98%.

In an embodiment, the sintered foam article is formed from foam beads composed of a crosslinked Si-g-OBC having a gel content from 45% to 55% and the sintered foam article has a dynamic recovery ratio from 94% to 96%.

Nonlimiting examples of suitable articles made from the present sintered foam article include footwear (e.g., midsoles of footwear), packaging, sporting goods, construction materials, and insulation.

The step of forming a sintered article from the foam beads may comprise two or more embodiments discussed herein.

The present process may comprise two or more embodiments discussed herein.

By way of example, and not limitation, some embodiments of the present disclosure will now be described in detail in the following Examples.

Examples

1. Materials

Materials used in examples are provided in Table 1 below.

TABLE 1

| Material/Description | Properties | Source |
|---|---|---|
| INFUSE ™ D9130.05: ethylene/octene multi-block copolymer | Density = 0.886 g/cc, 12 = 1.5 g/10 min, Shore A = 80 | Dow Inc. |
| Luperox 101 (2,5 dimethyl 2,5-di-t-butylperoxy Hexane), 90% | Density = 0.877 g/cc. | Arkema |
| XIAMETER OFS-6300 (vinyltrimethoxysilane (VTMS)) | Density = 0.97 g/cc. | Dow Corning |
| DBTDL (dibutyl tin dilaurate) | Density = 1.066 g/cc. | Sinopharm Chemical Reagent Co., Ltd |
| n-Octyltriethoxysilane | Density = 0.875 g/cc. | Sinopharm Chemical Reagent Co., Ltd |
| AC6000HG (Azodicarbonamide) | Melting point = 225° C. | Hangzhou Hi-tech Fine Chemical Co., Ltd |
| $TiO_2$ (Ti-Pure R-103) | Density = 4.23 g/cc, Melting point = 1,843° C. | The Chemours Company |
| Talc (grade SK6500P) | | Haicheng talk minerals Co. Ltd |
| Zinc stearate (ZnO and stearic acid) | | Sinopharm Chemical Reagent Co., Ltd |
| Perkadox 14S-FL (peroxide) | Di(tert-butylperoxyisopropyl) benzene | AkzoNobel |

2. Silane-Grafted Ethylene/a Multi-Block Copolymer (Si-g-OBC)

Crosslinking pellets composed of Si-g-OBC requires first producing Si-g-OBC. Procedure for producing silane-grafted INFUSE™ D9130.05 (Si-g-OBC) is performed on a 40 mm diameter, 48 L/D 12-barrel ZSK-40 Coperion twin-screw extruder. The line is equipped with a 135 kW motor and has a maximum speed of 1200 rotations per minute (RPM). Pellets of INFUSE D9130.05 are fed into the twin-screw extruder by loss in weight feeder. To prevent polymer oxidation, nitrogen is fed at the second barrel during the compounding process to sweep oxygen from the system. Melt discharge temperatures are measured using a hand-held thermocouple placed directly in the melt stream (Barrel set temperatures, from hopper to die, were 23/60/60/60/190/230/230/230/230/190/190/180° C.). A mixture of silane (XIAMETER OFS-6300) and peroxide (LUPEROX 101) is formed and injected through the liquid pump into the extruder at Barrel 6.

In order to minimize the concentration of volatile components and residual silane in the melt, a vacuum system is used to remove residual volatile components from the melt at barrel 11 in the process. A vacuum of 0.065-0.070 MPa is used.

An underwater pelletizer with a 16-hole die is used to produce Si-g-OBC pellets. Twelve of the 16 holes are plugged to suppress the formation of pellet "chains" during pelletizing. A 6-blade pelletizing hub is used.

The obtained Si-g-OBC has various grafted silane ratios (0.56-1.08%), based on the total weight of the silane-grafted ethylene/octene multi-block copolymer, hereafter referred to as Si-g-OBC. The silane grafting ratio is measured using Fourier transform infrared spectroscopy (FTIR) according to Chuanmei Jiao et al., Silane Grafting and Crosslinking of Ethylene-Octene Copolymer, 41 European Polymer J. 1204 (2005), the entire contents of which are incorporated herein by reference. The melt index of the obtained Si-g-OBC is measured. Table 2 lists the silane grafting ratio and melt index of the obtained Si-g-OBC.

TABLE 2

Silane grafting ratio and melt index of the silane grafted INFUSE D9130.05.

| Description | Silane grafting ratio (%)* | Melt index (g/10 min) | For which example |
|---|---|---|---|
| Infuse D9130.05 (not grafted) | 0 | 1.5 | CS1 |
| Si-g-OBC | 0.56 | 1.10 | IE7 |
| Si-g-OBC | 0.68 | 0.23 | IE6 |
| Si-g-OBC | 1.08 | 0.26 | CS2, CS3 and CS4 |

CS: comparative sample.
IE: inventive example.
*The amount of silane based on the total weight of the silane-grafted ethylene/octene multi-block copolymer silane grafting ratio (Reported in %).

3. Crosslinking of Si-g-OBC Pellets

Immersion of Si-g-OBC Pellets was Conducted Via Two Procedures, (I) and (II).

Procedure (I). Pellets composed of the Si-g-OBC are immersed into 70° C. water for 1 day to 7 days for hydrolytically crosslinking. The gel content was controlled by controlling the immersion time. The immersion crosslinking was stopped after reaching a desired gel content.

Procedure (II). Pellets composed of Si-g-OBC are soaked with in a catalyst solution of DBTDL in solvent n-octyltriethoxysilane (DBTDL/n-octyltriethoxysilane=3/10) at room temperature. 0.65 wt % of this catalyst solution (based on the weight of pellets) was placed into a sealable fluoro-plastic bottle, followed by adding the weighed Si-g-OBC pellets. To ensure a homogenous distribution and complete soaking of the additives into the Si-g-OBC pellets, the bottle is first tumbled for 1 min and then placed on a running roller (Model No. 88881004, Thermo Scientific) for further homogenization. After soaking, the soaked pellets are exposed to air for moisture crosslinking for 7 days.

Table 3 provides properties of the polymer pellets used for bead foam preparation for various comparative samples (CS) and inventive examples (IE). For the Si-g-OBC pellets, Table 3 identifies the method, procedure (I) or procedure (II) in which crosslinking was obtained. The gel content of the pellets is provided in Table 3. The 1.3% gel content of sample CS3 is a trace amount and considered in the error bar range. This 1.3% gel content is not considered a crosslinked gel content. The trace amount gel content in CS3 results after silane grafting, the trace amount is when a very small amount of silane reacts with another silane molecule in the absence of a catalyst and at a low temperature. DSC results showed that the heat of fusion slightly decreased after crosslinking. For CS4 pellet, a relatively high degree of crosslinking was achieved, thus Tm and heat fusion were decreased more significantly.

TABLE 3

Information of pellets used for bead foam preparation of various CS and IE.

| | Description | Silane grafting ratio (%) | Gel content (%) | Tm, ° C. | Heat Fusion, J/g |
|---|---|---|---|---|---|
| CS1 pellet | OBC (not grafted) Not-crosslinked | 0 | 0 | 121.1 | 66.5 |
| CS2 pellet | Si-g-OBC Not-crosslinked | 1.08 | 1.3 | 121.0 | 64.8 |
| CS3 pellet | Si-g-OBC Not-crosslinked | 1.08 | 1.3 | 121.0 | 64.8 |
| CS4 pellet | Si-g-OBC Procedure (II) XL by catalyst solution | 1.08 | 95.5 | 118.0 | 64.7 |
| IE6 pellet | Si-g-OBC Procedure (I) XL by hot water | 0.68 | 38.6 | 121.0 | 66.1 |
| IE7 pellet | Si-g-OBC Procedure (II) XL by catalyst solution | 0.56 | 69.6 | 121.0 | 64.2 |

Melting behavior of the pellets was obtained by DSC 1st heating curve.

4. Preparation of the Si-g-OBC Foam Beads Through Auto-Clave Batch Foaming

The pellets of CS1-4 and IE-6-7 are fed into an auto-clave equipped with a heating unit and gas injection valve. The auto-clave is heated to the polymer melting temperature. At the same time, the blowing agent (high pressure $CO_2$ in this case) is injected into the auto-clave for saturation (0.5~2 hours). The auto-clave pressure will vary depending on the polymer type. A typical range is from 50 to 200 bar. After the polymer is saturated with $CO_2$, a fast depressurization occurs and the foamed beads are prepared. The prepared foamed beads are conditioned at room temperature for several days to allow the gas exchange between the inside and outside of the beads. The properties of the Si-g-OBC foam beads are provided in Table 4 below.

TABLE 4

Foaming temperature and properties for Si-g-OBC foamed beads

| | Foaming temperature, ° C. | Bead density (g/cc) | Tm, ° C. | Heat Fusion, J/g | Gel content, % |
|---|---|---|---|---|---|
| CS1 bead | 100 | 0.188 | 121.0 | 67.2 | 0 |
| CS2 bead | 99 | 0.140 | 120.1 | 66.6 | 1.4 |
| CS3 bead | 99 | 0.140 | 120.1 | 66.6 | 1.4 |

TABLE 4-continued

| Foaming temperature and properties for Si-g-OBC foamed beads | | | | | |
|---|---|---|---|---|---|
| | Foaming temperature, ° C. | Bead density (g/cc) | Tm, ° C. | Heat Fusion, J/g | Gel content, % |
| CS4 bead | 117 | 0.130 | 116.3 | 55.4 | 95.5 |
| IE6 bead | 104 | 0.130 | 120.4 | 64.9 | 44.5 |
| IE7 bead | 108 | 0.125 | 120.8 | 63.9 | 69.6 |

Table 4 provides properties of foamed beads composed of Si-g-OBC. The foaming temperature is related to the Tm of the polymer and also related to the molecular weight of the polymer. If the temperature is too low, the polymer viscosity will be too high and thus the expansion ratio will be too low or even no expansion at all. If the temperature is too high, the pellets stick to each other due to the melting of the crystalline phase of the polymer and thus fail to form free flowing beads. The other issue associated with performing the foaming step at a temperature that is too high, is that the polymer viscosity will be too low to hold the cell structure and foam shrinkage or cell collapse will be observed. As can be seen from Table 4, to achieve similar bead density, relatively higher foaming temperature was needed for the pellets with higher gel content (shown in Table 4). This can be explained by the higher viscosity caused by partially crosslinking. For the pellet composed solely of ethylene/octene multi-block copolymer (and no silane graft), it was difficult to reach a bead density below 0.18 g/cc. In this sense, silane grafting (reduced melt index due to chain coupling, as shown in Table 2) and crosslinking improved the foamability of the pellets.

The melting behaviors of the foamed beads composed of crosslinked Si-g-OBC and non-crosslinked Si-g-OBC are also summarized in Table 4. DSC results showed that after crosslinking the heat fusion decreased. The foam beads of CS1-CS4 and IE6-IE7 each had a uniform cell size less than 100 micron.

5. Sintering Performance

Figure 2:
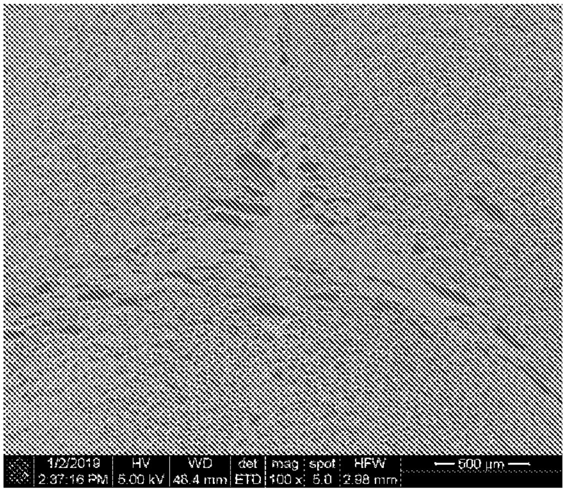
FIG. 2 provides Scanning Electron Microscope (SEM) images of cross-section views of sintered plaques of foam beads for comparative samples and inventive examples.
Figure 2:
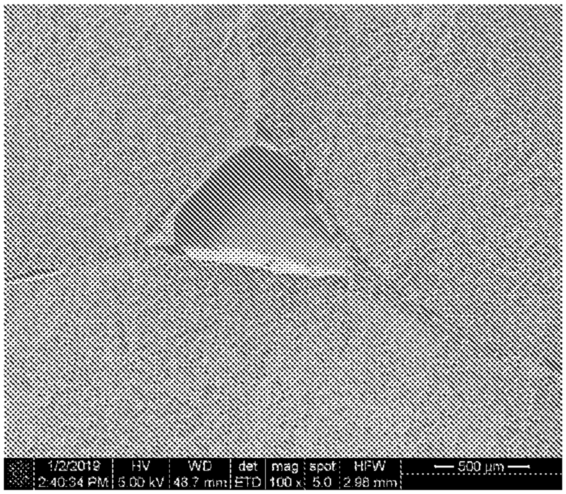
Figure 2:
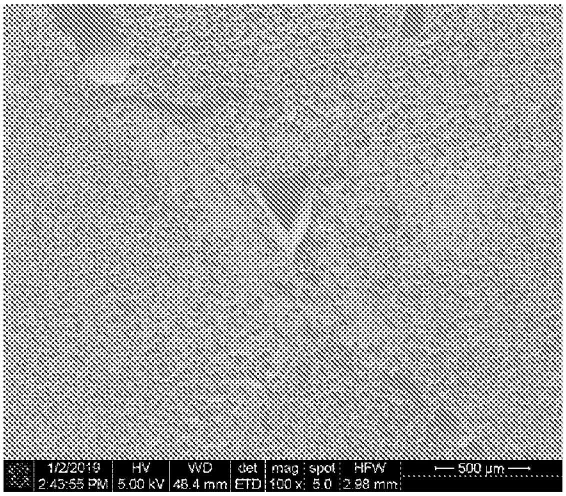
Figure 2:
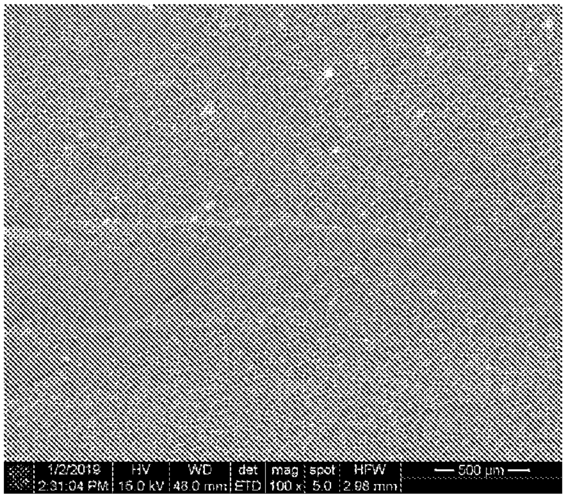

It was unexpectedly found that the sintering performance of beads was improved with increasing the gel content of the foamed beads, as shown in FIG. 1 and FIG. 2. In FIG. 2, IE7 exhibits almost no voids when viewed on the cross-section of the sintered foam plaque and interface between beads (three beads) was fused much better. Bounded by no particular theory, it is believed a gel content of 10% to 80% results in better shrink resistance, thus preventing bead shrinking and leading to less voids in the sintered plaque. However, if the gel content is greater than 80%, the beads will become non-sinterable because the mobility of polymer chains is reduced too much. This explains why CS4 bead (gel content 95.5%) cannot be sintered into a plaque at all.

6. Sintering of Crosslinked Si-g-OBC Foam Beads and Forming a Sintered Foam Article In order to form a sintered foam article, the foam beads from Table 4 are sintered using a steam-chesting procedure. The steam chesting procedure begins by having the foam beads vacuum sucked into a steam-chesting mold. Then a high-pressure steam is injected into the mold to heat/melt the beads surface. At the same time, the mold is closed to achieve the inter-beads sintering. The steam pressure is dependent on the polymer type used in the beads. The last step of the procedure is a water cooling process and vacuum process to remove the water. The whole cycle time is 2-5 min.

The sintered foam article samples are formed using the method described above and their properties analyzed. Table 5 summarizes the samples used in the preparation of the sintered foamed articles used in the tests below.

TABLE 5

| Foam beads for sintering. | | | | | | |
|---|---|---|---|---|---|---|
| | CS1 | CS2 | CS3 | CS 4 | IE6 | IE7 |
| Silane grafting ratio (wt %) | 0 | 1.08 | 1.08 | 1.08 | 0.68 | 0.56 |
| Crosslinking (XL) | Non-XL | Non-XL (Si-grafted) | Procedure (II) XL by catalyst solution | Procedure (II) XL by catalyst solution | Procedure (I) XL by hot water | Procedure (II) XL by catalyst solution |
| Blowing agent | $CO_2$ | $CO_2$ | $CO_2$ | $CO_2$ | $CO_2$ | $CO_2$ |

Table 6 lists the properties of the sintered foam articles composed of Si-g-OBC that are prepared through steam-chesting.

TABLE 6

| Performance of the sintered foam articles composed of Si-g-OBC | | | | | | |
|---|---|---|---|---|---|---|
| Plaque properties | CS1 Non-XL | CS2 Non-XL (Si-grafted) | CS3-1 Procedure (II) XL by catalyst solution | CS4 Procedure (II) XL by catalyst solution | IE6 Procedure (I) XL by hot water | IE7 Procedure (II) XL by catalyst solution |
| Gel content | 0 | 2.3 | 84.5 | Foam beads cannot be sintered | 49.2 | 69.6 |
| Asker C | 42.6 | 36.4 | 41.0 | | 40.2 | 40.0 |
| Density Skin | 0.240 | 0.216 | 0.208 | | 0.205 | 0.193 |

For comparative sample CS3-1 in Table 6, the foam bead of CS3 (from Table 4) was soaked in dibutyl tin solution to crosslink the CS3 foam bead to a gel content of 84.5%, and form foam bead CS3-1. Foam bead CS3-1, having gel content of 84.5% was subsequently sintered to form sintered foam article CS3-1 in Table 6.

Figure 3:
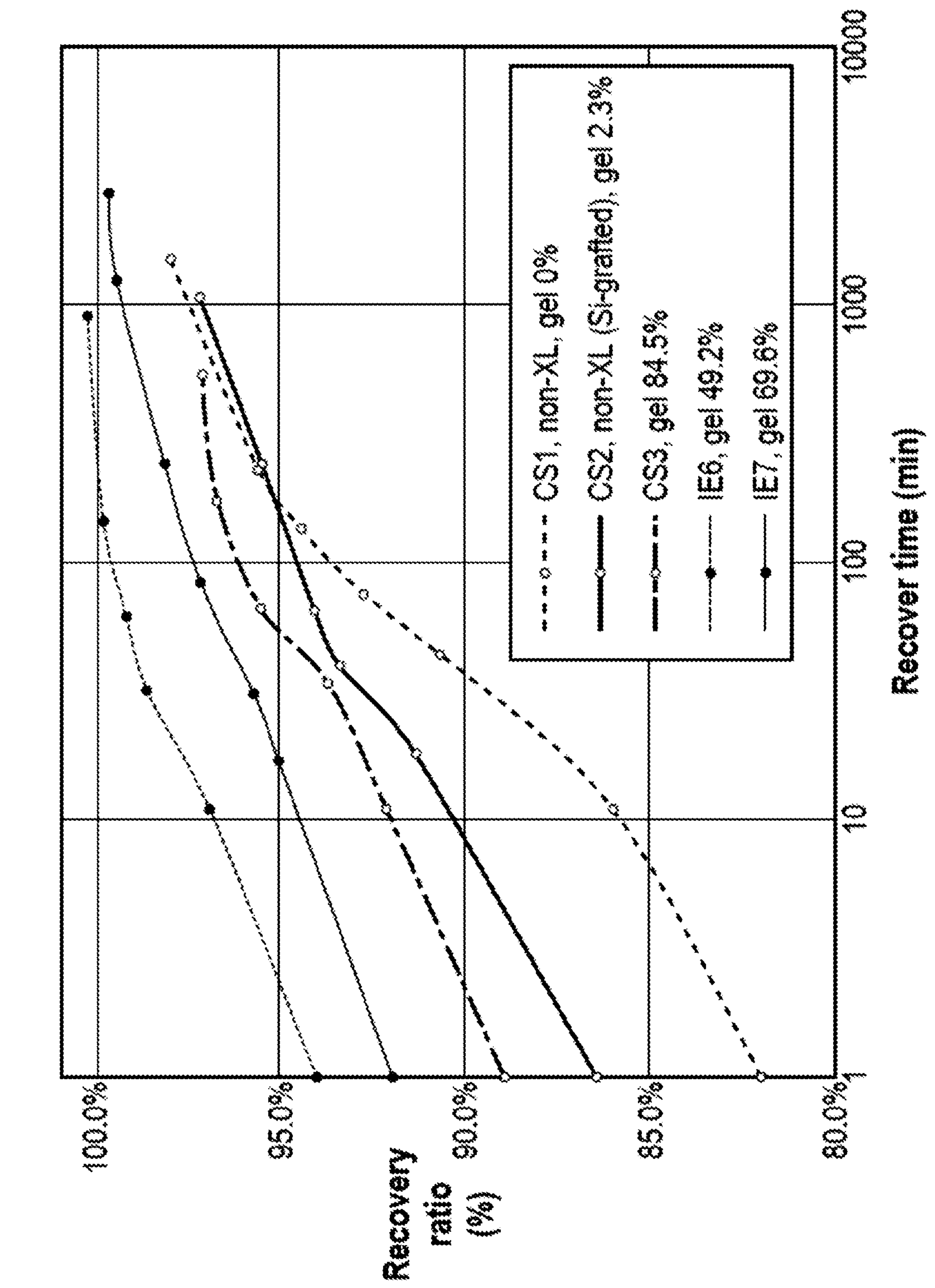
FIG. 3 is a graph showing the recovery ratio of foam plaque thickness as a function of time for comparative samples and inventive examples.

FIG. 3 presents the results of dynamic recovery of the sintered foam articles provided in Table 6. Here, the value of immediate dynamic compression set is obtained from the recovery ratio at 1 min (Immediate dynamic compression set=2*(1−recovery ratio@1 min)). In FIG. 3, the recovery ratio at recovery time 1 minute is the primary performance indicator. CS1 (made of non-sintered, non-crosslinked OBC) had the poorest immediate dynamic compression set with 82% recovery ratio at 1 minute. Sample CS2 is silane grafted but not crosslinked (gel 2.3%) and exhibits an 87% recovery ratio at 1 minute. The CS3 sample yields a recovery ratio of 89% at 1 minute. Unexpectedly, we found that IE6 and IE7 samples, which were crosslinked to gel content of 10-80% before the foaming step, have the best immediate dynamic compression set, with respective recovery ratios at 1 minute of 93% and 98%. Looking at extended recovery time (more than 1 min), IE6 and IE7 recovered almost 100% in a shorter time, compared to the other samples that were either non-crosslinked or cross-linked after the foam bead procedure. This shows that crosslinking the Si-g-OBC polymer to a gel content from 10% to 80% before the foaming step, results in sintered foam articles of high performance.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A process comprising:

immersing pellets of a silane-grafted ethylene/α-olefin multi-block copolymer (Si-g-OBC) in water;

crosslinking the Si-g-OBC pellets to a gel content from 10% to 80% to form crosslinked Si-g-OBC pellets; and foaming the crosslinked Si-g-OBC pellets to form crosslinked Si-g-OBC foam beads having a gel content from 10% to 80%.

2. The process of claim 1 wherein the foaming comprises contacting the pellets of crosslinked Si-g-OBC with a blowing agent under foaming conditions; and forming the crosslinked Si-g-OBC foam beads.

3. The process of claim 1 comprising forming crosslinked Si-g-OBC foam beads having (i) a melting temperature from 117° C. to 121.5° C.; and (ii) a heat of fusion, ΔH in J/g, from 63 to 65.

4. The process of claim 1 comprising sintering the crosslinked Si-g-OBC foam beads; and forming a sintered foam article.

5. The process of claim 4 comprising forming a sintered foam article having (i) a hardness from 40.0 to 41.0 measured according to Asker C;

(ii) a density from 0.190 g/cc to 0.210 g/cc; and (iii) a dynamic recovery ratio, measured at 1 min, from 87.0% to 100%.

6. The process of claim 1 wherein the crosslinked Si-g-OBC foam beads have a density from 0.125 g/cc to 0.135 g/cc.

7. The process of claim 6 wherein the crosslinked Si-g-OBC foam beads have a gel content from 20% to 75%.

8. A process comprising:

soaking pellets of a silane-grafted ethylene/α-olefin multi-block copolymer (Si-g-OBC) with a dibutyl tin solution;

catalytically crosslinking the Si-g-OBC pellets to a gel content from 10% to 80% to form crosslinked Si-g-OBC pellets;

foaming the crosslinked Si-g-OBC pellets to form crosslinked Si-g-OBC foam beads having a gel content from 10% to 80%.

* * * * *